Patented Mar. 11, 1941

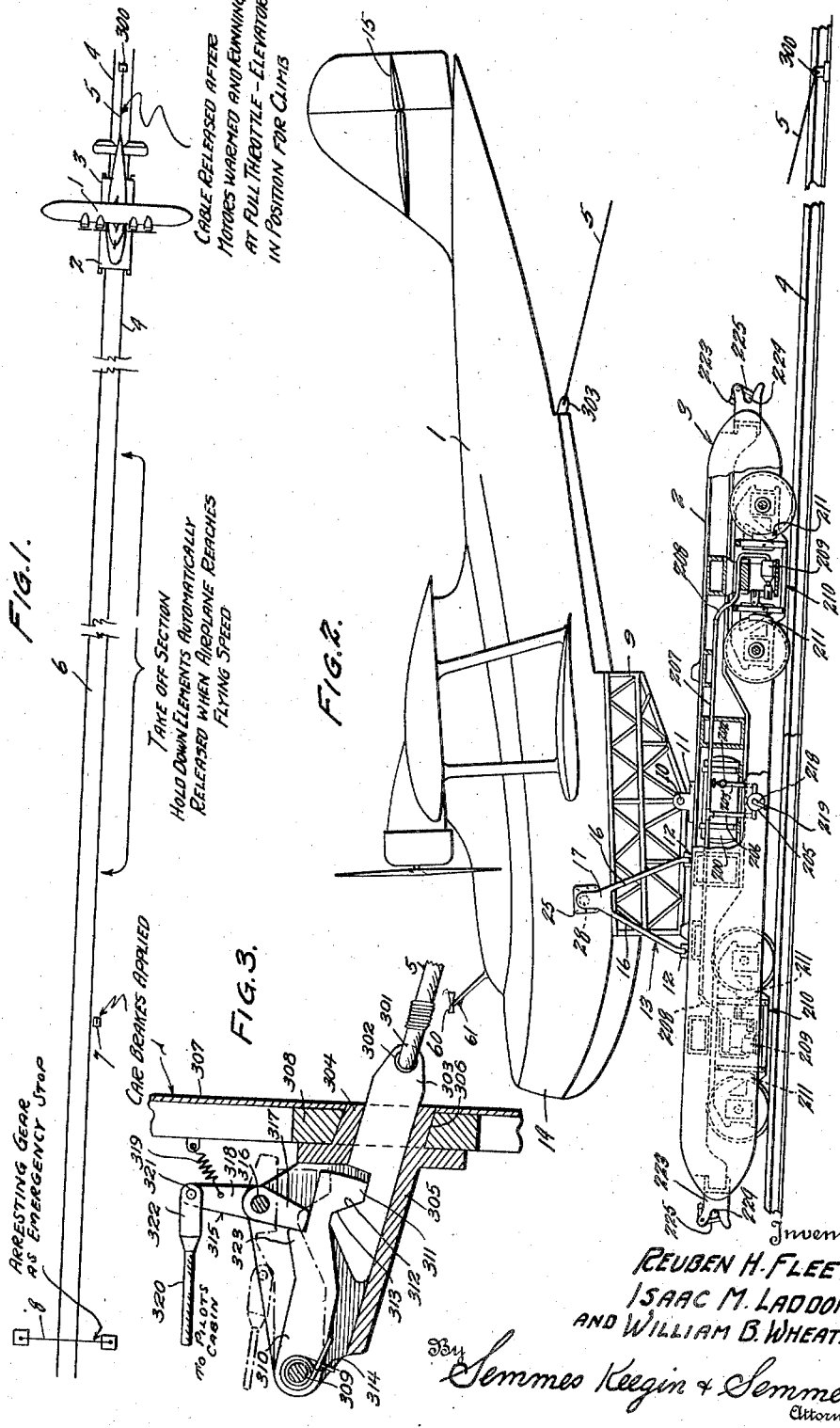

2,234,752

UNITED STATES PATENT OFFICE 2,234,752

HOLDING DEVICE FOR AN AIRPLANE

Reuben H. Fleet, William B. Wheatley, and Isaac M. Laddon, San Diego, Calif.

Original application April 24, 1937, Serial No. 138,844. Divided and this application April 2, 1938, Serial No. 199,700

4 Claims. (Cl. 244—110)

Our invention relates to the launching of airplanes, and more particularly to the launching of airplanes from moving vehicles.

This application is a divison of our co-pending application Serial No. 138,844, filed April 24, 1937.

Heretofore there have been no efficient means of control of takeoff of an airplane, other than the skill of the pilot.

Often a heavily laden plane will travel down a field, without rising in the air, a distance greater than it should travel before the brakes are applied. This mistake in judgment on the part of the pilot often results in accidents.

An object of the invention is to provide a novel form of hold-back mechanism by which the airplane is fastened at a point at the beginning of its run while the motors are being warmed up.

Another object of the invention is to permit the launching of airplanes without human attention, or at least without skilled handling during the takeoff run until after the plane leaves the vehicle. In this connection the completely automatic take off is especially valuable for flights controlled by robot pilots.

With these and other objects in view, which may be incident to our improvements, the invention consists in the parts and combinations to be hereinafter set forth and claimed, with the understanding that the several necessary elements comprising our invention may be varied in construction, proportions and arrangement, without departing from the spirit and scope of the appended claims.

In order to make our invention more clearly understood, we have shown in the accompanying drawing means for carrying the same into practical effect without limiting the improvements in their useful applications to the particular constructions which, for the purpose of explanation, have been made the subject of illustration.

In the drawing:

Figure 1 is a diagrammatic view of a system employing my invention.

Figure 2 is a view in side elevation of a seaplane mounted on my supporting vehicle, part of the supporting vehicle being broken away to show the construction.

Figure 3 is a detail view partly in section of the attachment for the hold-back device whereby the airplane is attached to the hold-back cable.

In our system the airplane is held on the supporting vehicle with its nose held down, so that the airplane is in a substantially no-lift attitude. The elevators may be set to raise the nose of the airplane. The airplane is held at the end of the track which supports the launching vehicle by means of a cable.

The motors of the airplane are warmed up and are running full throttle, (or desired power output for takeoff), at which time the cable is released, allowing the motive power of the airplane to move the airplane and the vehicle down the track with increasing speed. The center of gravity of the airplane is, in general, located behind the point of pivoting of the cradle on which the airplane rests. The airplane is held, however, in the substantially no-lift attitude by reason of hold-down members which are attached to the supporting vehicle. When a proper air speed is reached, the hold-down members for the nose of the airplane are released, and the fact that the center of gravity of the airplane lies behind the pivot of the cradle on which the airplane rests, in addition to the fact that the elevators are set to raise the nose of the airplane, causes the airplane to quickly assume a substantially high angle of attack attitude, and the airplane will then quickly take off from the supporting vehicle.

At a certain point in its run, a trip at the side of the track automatically applies the brakes to the vehicle on which the airplane is supported. The location of this trip may be varied as required. If the airplane has not taken off from the vehicle when this point is reached, both airplane and vehicle are then arrested. However, if the airplane has taken off from the vehicle, the brakes will stop the vehicle. An arresting cable at the end of the run prevents overrunning of the vehicle beyond the end of the track.

Referring to the drawing, in Figure 1 we have shown an airplane 1 mounted on a platform 2 of a vehicle 3. The vehicle 3 is adapted to travel on tracks 4. In Figure 1 the airplane 1 is shown held by a cable 5 at one end of the track. The motors of the airplane are warmed up, and when they are running at desired power output the pilot releases the cable 5, as will be later described, and the airplane runs down the track, gaining speed. The elevators of the airplane are set in the position to raise the nose of the airplane. The nose is held down by holding means until the air speed is sufficient for the take off of the airplane from the vehicle. The section of the track on which this will normally occur is indicated in the drawing, Figure 1.

If the airplane takes off before the point in Figure 1 where it is indicated that the car brakes are applied, the vehicle 3 is merely arrested by the application of the brakes, overrunning being prevented by the arresting gear.

We have indicated the section of track on which takeoff usually occurs by the numeral 6, the point at which the car brakes are applied as numeral 7, and the arresting gear to prevent overrunning of the vehicle by the numeral 8.

If sufficient air speed is not attained for the takeoff of the airplane from the vehicle by the time the vehicle reaches the position indicated by the numeral 7, the car brakes are applied and the vehicle, with the airplane on it, is arrested.

Referring to Figure 2, we have shown the airplane 1 as a seaplane. It is adapted to be mounted in a cradle 9 which is pivoted on a shaft 10 mounted in supports 11 which are attached to the surface of the platform 2. On either side of the airplane, and pivoted at points 12 to the upper surface 2 of the vehicle 3, are holding members 13 which are adapted to hold the nose 14 of the airplane down, as indicated in Figure 2.

In Figure 2 we have shown an elevator 15 in a normal position. At the beginning of the run the elevator 15 is generally set in a position to raise the nose 14 of the airplane. The center of gravity of the airplane is somewhat back of the pivot shaft 10, tending to raise the nose and lower the tail, but the holding members 13 on either side of the plane prevent this from happening until they are released. Additionally, the setting of the elevators when a substantial forward speed is obtained tends to raise the nose 14.

The hold-down mechanism for holding the airplane in the beginning of the run will now be described. Referring to Figure 1, we have shown that there is a cable 5 which holds the airplane at the beginning of the run until the motors are running full throttle, at which time the pilot releases the cable 5 from the airplane, and the airplane and the launching vehicle, preferably only under the power of the motive power plant of the airplane, proceed down the rail track 4.

The cable 5 is attached to an anchor member 300 which may be mounted between the rails of the rail track 4. The cable 5 has a loop 301 which is adapted to pass through an aperture 302 in a male member 303 which is adapted to slide in a slideway 304 formed in a support member 305 which fits within an aperture 306 formed in the bottom 307 of the fuselage. The aperture 306 is braced by means of a bracing member 308 which acts as a support for the strain imposed by forces acting through the support member 305.

Pivoted on the support member 305 on a pivot 309 is a fastener 310. The fastener 310 is provided with a catch 311 having a sloping surface 312 which is adapted to engage a sloping surface 313 formed on the end of the male member 303. A coil spring 314 is adapted to urge the fastener 310 in the up, or disengaging, position. The slope of the surfaces 312 and 313 is such as to tend to move the fastener 310 in the up, or disengaged, position. In order to hold the fastener 310 in the down, or engaging, position, there is provided a release member 315 which is pivoted on a pivot 316 supported by the socket 305. One arm 317 of the release member 315 is adapted to bear against the top of the fastener 310.

The other arm 318 of the release member 315 is held in the position indicated in solid lines in Figure 3 by means of a spring 319 which is attached to the arm 318 and to the fuselage 307. A cable 320 is pivotally attached at 321 through a suitable connection 322 to the arm 318 of the release member 315.

A stop 323 prevents the spring 319 from moving the release member beyond the position shown in solid lines in Figure 3. Upon the pilot pulling on cable 320, the release member 315 is pivoted on its pivot 316 against the tension of the spring 319 to move the arm 317 out of engagement with the top of the fastener 310. The fastener 310 is raised to the position shown in dotted lines in Figure 3 under the tension of the spring 314 and because of the forces exerted by the engaging surfaces 312 and 313. The airplane is then freed from the hold-down mechanism and can proceed on its run.

In operation, the airplane, with its nose held down in the substantially no-lift attitude, is resting on the launching vehicle 3 at the beginning of the run, as indicated in Figure 1. The cable 5 holds the airplane and the supporting vehicle from forward movement while the engines are being warmed up and until they are running full throttle. The elevators 15 are set to lift the nose of the airplane, but are prevented from functioning until the nose of the airplane is no longer held down by the holding members 13.

When the motor is running full throttle, or at desired power output, the pilot pulls on cable 220 and releases the airplane and vehicle which, under the power of the motive power plant of the airplane, runs down the rail tracks 4 until sufficient air speed is attained for the closing of contacts 70 and 71.

The closing of these contacts releases the holding members 13, as previously described, and permits the airplane to rock back on the cradle 9 and to quickly take off from the launching vehicle. At the same time, cut-out switch 49 is opened to prevent drain on the batteries and overheating of the coils 45.

As the vehicle passes the trip mechanism located at 7 along the track, the brakes are applied and, in case the vehicle is still moving, the arresting cable 8 will stop the vehicle.

If sufficient air speed has not been attained during the run and before the point 7 is reached on the track, the nose of the airplane will be held down in the position indicated in Figure 2 and the airplane cannot take off from the supporting vehicle.

Thus, automatic control of takeoff is substituted for the pilot's judgment, and safety factors are introduced into the launching of airplanes which have never heretofore been possible.

With our invention no human attention is required to safely get the aircraft into the air; in fact if a robot pilot such as the Sperry automatic airplane pilot were used on the airplane, no human need even be aboard the aircraft (this might be desirable in time of war in the case of a very dangerous mission where the airplane would be expended to accomplish the mission). Also in time of war, planes might be launched with our invention, manned by crews not sufficiently skilled to make safe takeoffs in the normal way, yet who could guide the plane in flight, and could probably land the plane, which would be much lighter after returning from a mission, without damaging it.

The arrangement of the device to "automatically launch" an airplane would be such that the relation of the supports and the center of gravity would cause the aircraft to pivot to the takeoff attitude when the forward support was released. With the elevators set for normal climb, or if the automatic (robot) pilot was set for a climbing attitude, then when the forward release was disconnected the plane would "automatically take off."

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention, or exceeding the scope of the appended claims.

We claim:

1. A hold-back device for an airplane comprising a male member, a fastener for engaging the male member, a pivoted release member carried by the airplane for locking the fastener in engaging position, the release member being aligned in its locking position with the line of movement of the fastener, the zone of contact between the release member and the fastener extending substantially beyond said locking position in both an inward and an outward direction relative to the line of entry of the male member.

2. A hold-back device for an airplane comprising a male member, having a slot therein, a tension element attached to the male member, a slideway adapted to receive the male member, a fastener for engaging said slot, said fastener being movable in a direction perpendicular to that of the tension element, said slot and said fastener having slanted cooperating holding surfaces so related to the line of movement of the male member that a pull outward from the slideway tends to separate the fastener from said slot, a pivoted release member for locking the fastener in engaging position, said pivoted member being aligned in its locking position with the line of movement of the fastener, the zone of contact between said pivoting member and the fastener extending substantially beyond said locking position in both an inward and an outward direction relative to the line of entry of the male member.

3. A hold-back device for an airplane comprising a tension element, a member attached to the tension element, a slideway carried by the airplane for slidably receiving the member, means carried by the airplane for laterally engaging the member, a pivoted release adapted to hold the engaging means in engaged position, link means adapted to be operated by the pilot for moving the release to permit the engaging means to release the member, and a spring carried by the release tending to hold the release in its engaging position, the member and the engaging means having cooperating beveled surfaces to prevent sliding of the member when engaged by the engaging member, said surfaces being adapted to cause a limited displacement of the member in case the member is originally positioned too deep or too shallow for being engaged when the engaging means is moved into engaging position.

4. A hold-back device for an airplane comprising a support member having a slideway therein, a male member slidable in the slideway, the male member having engaging surfaces laterally engageable, a fastener carried by the support member and having fastening surfaces for locking the male member in position against one surface of the slideway, said engaging surfaces on the male member when in locked position lying completely outside the path of said fastening surfaces from free to locking position, whereby the male member may be placed in the slideway to the proper depth and locked in position without further movement of the male member, a release member pivotally carried by the support member and having an arm presenting an area of contact with the fastener, said fastener-contacting area being adapted to contact a portion of the fastener when any strain on the release member from the fastener is substantially on a line between the fastener and the pivot of the release member, whereby the fastener is held in locking position, means to pivot the release member into strain-aligning position, means to prevent pivoting of the release member substantially beyond said strain-aligning position, means to pivot the release member out of said strain-aligning position, said male member being adapted to be connected permanently to a holding member outside an airplane, means to move the fastener out of locking position when a pulling force is applied to the male member and the release member has moved out of said strain-aligning position.

REUBEN H. FLEET.
WILLIAM B. WHEATLEY.
ISAAC M. LADDON.